(12) United States Patent
Gomyo et al.

(10) Patent No.: US 7,088,023 B1
(45) Date of Patent: Aug. 8, 2006

(54) MOTOR UNIT, MANUFACTURING METHOD THEREFOR AND RECORDING DISK DRIVING APPARATUS

(75) Inventors: Masato Gomyo, Kyoto (JP); Shingo Suginobu, Kyoto (JP)

(73) Assignee: Nidec Corporation, Kyoto (JP)

(*) Notice: Subject to any disclaimer, the term of this patent is extended or adjusted under 35 U.S.C. 154(b) by 0 days.

(21) Appl. No.: 10/907,954

(22) Filed: Apr. 22, 2005

(51) Int. Cl.
*H02K 7/08* (2006.01)
*H02K 15/00* (2006.01)

(52) U.S. Cl. .................. 310/90; 310/42; 310/67 R; 360/99.08

(58) Field of Classification Search .............. 310/42, 310/67 R, 90, 254
See application file for complete search history.

(56) References Cited

U.S. PATENT DOCUMENTS

| | | | | |
|---|---|---|---|---|
| 5,459,361 A | * | 10/1995 | Morioka | 310/67 R |
| 6,005,312 A | * | 12/1999 | Yamane | 310/67 R |
| 6,242,826 B1 | * | 6/2001 | Saito et al. | 310/51 |
| 6,252,322 B1 | * | 6/2001 | Kawawada et al. | 310/90 |
| 6,339,515 B1 | * | 1/2002 | Lee et al. | 360/99.08 |
| 6,512,654 B1 | * | 1/2003 | Teshima | 360/99.08 |
| 6,700,256 B1 | * | 3/2004 | Fukutani et al. | 310/90 |
| 6,894,817 B1 | * | 5/2005 | Matsui et al. | 359/198 |
| 2002/0047394 A1 | * | 4/2002 | Obara et al. | 310/90 |

FOREIGN PATENT DOCUMENTS

| | | |
|---|---|---|
| JP | H06-225495 A | 8/1994 |
| JP | 2000-082252 A | 3/2000 |
| JP | 2003-214432 A | 7/2003 |
| JP | 2003-294050 A | 10/2003 |

* cited by examiner

*Primary Examiner*—Burton Mullins
(74) *Attorney, Agent, or Firm*—Judge Patent Firm

(57) ABSTRACT

In a motor unit as an example of the invention, a bearing assembly 5 is securely held on an inner circumferential portion of a hollow cylindrical section 11a of a first housing member 11 with an adhesive section 52 interposed therebetween. The adhesive section 52 includes: a first adhering subsection 52a in which an anaerobic adhesive is present and a second adhering subsection 52b in which an externally stimulated curing type adhesive cured by heating or ultraviolet irradiation is present. Inserting the bearing assembly 5 into the hollow cylindrical section 11a produces a temporarily fixed state by the first adhering subsection 52a, thereby enabling the external stimulated curing type adhesive to be stably cured in the temporarily fixed state.

16 Claims, 10 Drawing Sheets

MOTOR UNIT, MANUFACTURING METHOD THEREFOR AND RECORDING DISK DRIVING APPARATUS

BACKGROUND OF THE INVENTION

1. Field of the Invention

The invention relates to a motor unit having a bearing assembly forming a fluid dynamic pressure bearing supported on an inner circumferential portion of a housing member with an adhesive section interposed therein, a manufacturing method and a recording disk driving apparatus.

2. Description of the Related Art

Motor units each having a spindle motor unit equipped with a fluid dynamic pressure bearing in the presence of oil in a micro gap between a shaft and a hollow cylindrical sleeve have been employed in various kinds of electronic equipment such as a recording disk driving apparatus.

In such a motor unit, a sleeve is securely held on an inner circumferential portion of a housing member with an adhesive section interposed therebetween. In the motor unit having such a holding structure, the sleeve is securely held on the housing member by an adhesive force of the adhesive section. Adhesives generally used in this case include: a thermosetting adhesive cured by heating; an ultraviolet curing type adhesive cured by irradiation with ultraviolet, an anaerobic adhesive cured by shutting-off outside air and others.

In a case where the above adhesives are used, the following problems occur, however. A thermosetting adhesive has a high adhesive strength, but it takes a long time to cure the adhesive. Hence, the sleeve and the housing member have to be held in an immobile state with respect to positions thereof using a comparative large scale jig till the applied adhesive cures. Therefore, because it accommodated the motor unit and the jig together in the oven for curing the thermosetting adhesive, the productivity might be not excellent.

An ultraviolet curing adhesive is fast in curing speed, but there arises a case where the ultraviolet curing adhesive is not cured since ultraviolet does not reach a site such as a deep narrow gap.

An anaerobic adhesive is fast in curing speed, but curing is limited to a deep, narrow gap and what's worse, there arises a case where things around or near the adhesive is contaminated by outgassing from the adhesive in an uncured state.

BRIEF SUMMARY OF INVENTION

It is an object of the present invention to provide a motor unit good in productivity and capable of having a high adhesive strength, a manufacturing method therefor and a recording disk driving apparatus.

A motor unit having a electric motor as an example of the present invention includes: a housing member having a hollow cylindrical section; a bearing assembly securely held on an inner circumferential portion of the hollow cylindrical section with an adhesive section interposed therebetween and a rotor assembly rotatably supported by the bearing assembly.

A joint section comprises an inner circumferential portion of the hollow cylindrical section, an outer circumferential portion of the bearing assembly and the adhesives intervening therebetween. Formed in the joint section are a first adhering subsection in which an anaerobic adhesive cured by shutting off outside air is present and a second adhering subsection in which an externally stimulated curing type adhesive cured by at least one of heating and ultraviolet irradiation is present.

A method for joining the hollow cylindrical section formed approximately coaxially with a central axis to the bearing assembly in the middle of the housing member as an example of the invention includes: holding the housing member; disposing the bearing assembly approximately coaxially with the hollow cylindrical section to hold the bearing assembly; and moving the bearing assembly relatively to the housing member in an axial direction to insert the bearing assembly into the hollow cylindrical section of the housing member, to thereby join an outer circumferential portion of the bearing assembly to an inner circumferential portion of the hollow cylindrical section and to form a joint section between both members.

The above method includes: a step of, in advance of forming the joint section, applying an anaerobic adhesive forming a first adhesive subsection and cured by shutting off outside air on at least one of the inner circumferential portion of the hollow cylindrical section and the outer circumferential portion of the bearing assembly forming the joint section; and a step of, in advance of forming the joint section, applying an externally stimulated curing adhesive forming a second adhesive subsection and cured by at least one of heating and irradiation with ultraviolet on at least the other of the inner circumferential portion of the hollow cylindrical section and the outer circumferential portion of the bearing assembly forming the joint section.

The adhesive in the first adhesive subsection is quickly cured by inserting the bearing assembly into the hollow cylindrical section, and the bearing assembly is temporarily fixed to the housing member. It enables the external stimulated curing type adhesive to be stably cured in the temporarily fixed state. Therefore, not only can it be suppressed for things around and near the anaerobic adhesive to be contaminated by outgassing with decrease in the adhesive used, but a high joining strength can also be obtained by the external stimulated curing adhesive.

DETAILED DESCRIPTION OF THE INVENTION

Description will be given of embodiments of the invention below with reference to the accompanying drawings. Note that when positional relations of members and directions are described with upward or downward, or leftward or rightward, the positional relations and directions indicate themselves in a corresponding view in a figures in the strict sense of the term, but they do not indicate positional relations and directions when being assembled in actual equipment.

First Embodiment

Overall Construction of Spindle Motor

Figure 1:
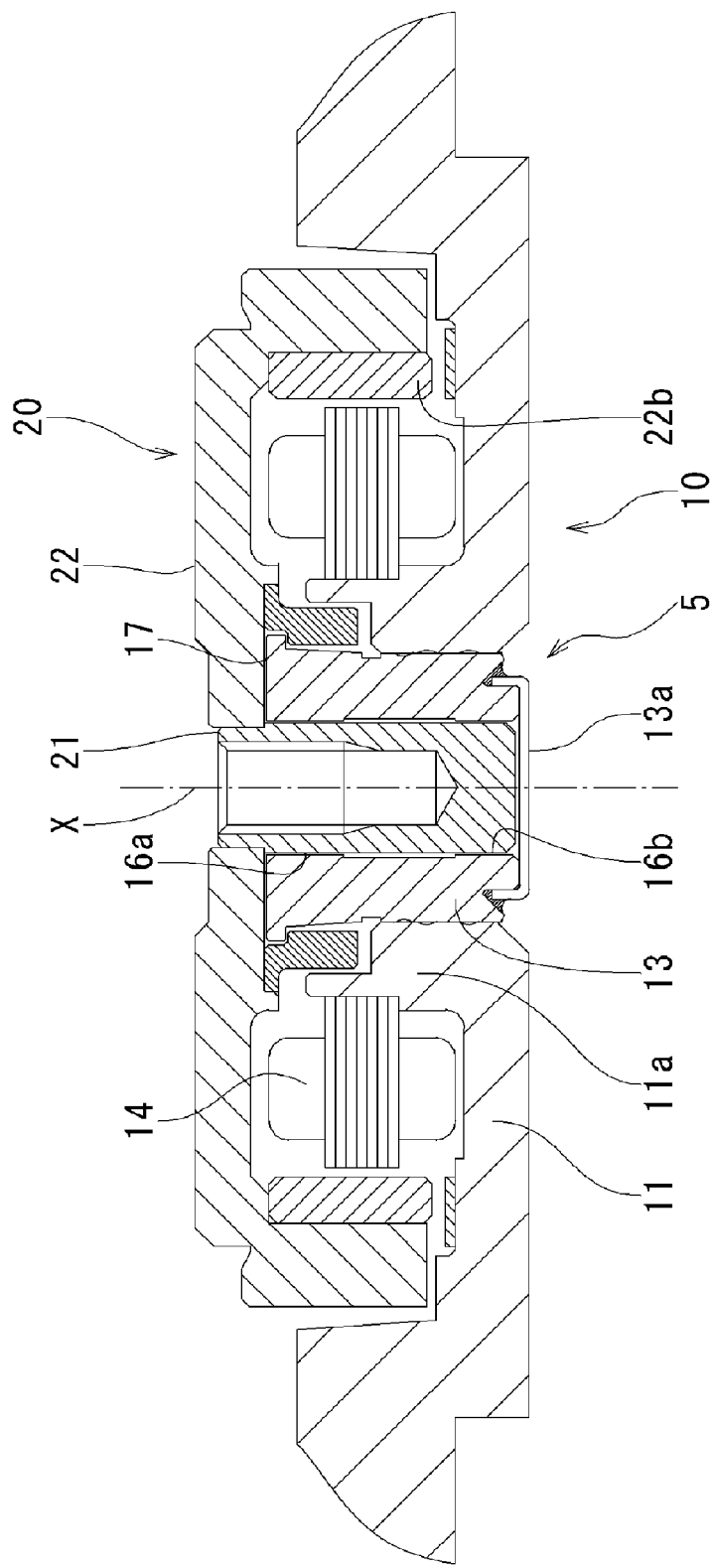
FIG. 1 is a longitudinal sectional view showing a motor unit related to a first embodiment of the invention.

A spindle motor shown in FIG. 1 includes: a first housing member 11; a bearing assembly 5; and a rotor assembly 20. A hollow cylindrical section 11a is formed in the middle of the first housing member 11 approximately coaxially with the central axis X. The bearing assembly 5 is securely held by plural adhesives described later on an inner circumferential portion of the hollow cylindrical section 11a and a stator 14 is held on an outer circumferential portion of the hollow cylindrical section 11a.

The bearing assembly 5 includes: a sleeve 13 having a hollow cylindrical shape which made of a copper-based material such as phosphor bronze; a cover member 13a closing the lower end of the sleeve 13 in the axial direction thereof; and a shaft 21 facing an inner circumferential portion of the sleeve 13 with a micro gap interposed therebetween and rotating around the central axis X.

The rotor assembly 20 includes: the shaft 21; a rotor hub 22 having a cup shape which is fixed at the top end portion of the shaft 21 in the axial direction thereof; and a rotor magnet 22b secured on the outer circumferential portion of the rotor hub 22 and facing the stator 14 in the radial direction.

Then, detailed description will be given of a fluid dynamic pressure bearing. A pair of radial dynamic pressure bearing sections 16A and 16B are formed spaced apart from each other in the axial direction between an inner peripheral surface of the sleeve 13 and an outer peripheral surface of the shaft 21. Each of the radial dynamic bearing sections 16A and 16B includes: the inner peripheral surface of the sleeve 13; the outer peripheral surface of the shaft 21; and oil retained in the micro gap between the inner peripheral surface of the sleeve 13 and the outer peripheral surface of the shaft 21. For example, herring bone grooves (not shown) are formed on each of portions constituting the respective radial dynamic bearing sections 16A and 16B of the inner peripheral surface of the sleeve 13 and when the rotor assembly 20 rotates, a pressure is induced in the oil that directs to the middle portion from the top and bottom end portions of the radial dynamic pressure bearing sections 16A and 16B in the axial direction thereof. The oil moved to the approximately centers of the respective radial dynamic pressure bearing sections 16A and 16B produces maximum pressures in the approximately centers of the respective radial dynamic bearing sections 16A and 16B and supports the rotor assembly 20.

A thrust dynamic pressure bearing section 17 is formed between the top end surface of the sleeve 13 and a lower surface of the rotor hub 22 facing the top end surface of the sleeve 13 in the axial direction. The thrust dynamic pressure bearing section 17 includes: the top end surface of the sleeve 13; the lower surface of the rotor hub 22; and oil retained in a micro gap between the top end surface of the sleeve 13 and the lower surface of the rotor hub 22. For example, a spiral groove (not shown) that directs inward in the radial direction is formed on the top end surface of the sleeve 13 and when the rotor assembly 20 rotates, a pressure is induced in the oil that directs inward in the radial direction. The oil produces a higher pressure in the oil and thereby, a fluid dynamic pressure to cause the rotor assembly 20 to float upward in the axial direction.

It should be noted that the pressure generated in the thrust dynamic pressure bearing section 17 is at a level that somewhat exceeds atmospheric pressure, which consequently is prohibitive lift being put on the rotor assembly 20 with the thrust dynamic pressure bearing section 17 alone. The oils retained in the micro gap in a pair of the radial dynamic pressure bearing sections 16A and 16B, and in the thrust dynamic pressure bearing section 17 are continuously connected to each other without a disconnection. Hence, since a pressure in the oil retained in a clearance between a lower end surface of the shaft 21 and an upper end surface of the cover member 13a is an approximately equal to a internal pressure of the oil raised by a fluid dynamic pressure induced in the thrust dynamic pressure bearing section 17, the micro gap between the lower end surface of the shaft 21 and the upper surface of the cover member 13a functions as a static pressure bearing section. Therefore, the interaction of the thrust dynamic pressure bearing section 17 and the static pressure bearing section enables the rotor assembly 20 to be sufficiently lifted.

Adhesion of Sleeve 13 to First Housing Member 11

An adhesive section 52 for fixedly attaching the hollow cylindrical section 11a and the sleeve 13 to each other is formed in a joint section 50 joining an inner circumferential portion of the hollow cylindrical section 11a of the first housing member 11 and an outer circumferential portion of the sleeve 13 together.

To be more detailed, the adhesive section 52 includes a first adhesive subsection 52a and a second adhesive subsection 52b. The first adhesive subsection 52a includes an anaerobic adhesive and the second adhesive subsection 52b includes an ultraviolet/heat curing type (an externally stimulated curing type) adhesive cured by at least one of heating and irradiation with ultraviolet.

The first adhesive section 52a is formed in an upper portion of the joint section 50 in the axial direction, while the second adhesive section 52b is formed in a lower portion of the joint section 50 in the axial direction.

Then, detailed description will be given of the joint between the sleeve 13 and the first housing member 11 with reference to FIGS. 3 to 5.

Figure 2:
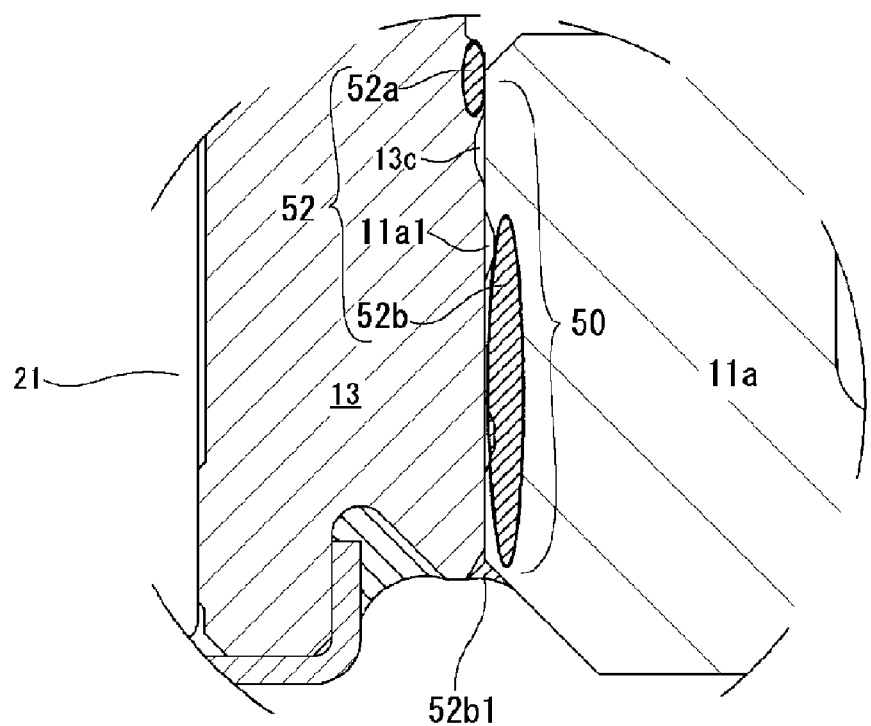
FIG. 2 is a partial enlarged longitudinal sectional view of the motor unit shown in FIG. 1.
Figure 3:
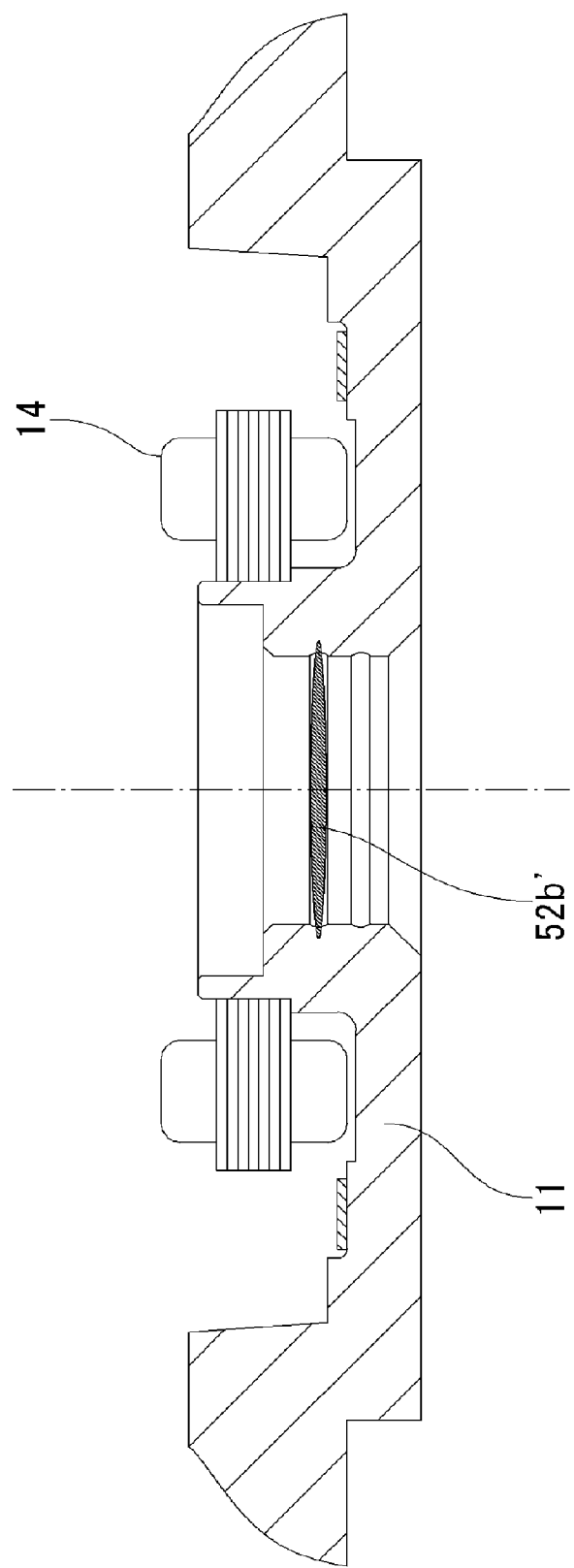
FIG. 3 is a longitudinal sectional view showing a joining step of a sleeve to a first housing member.

The first housing member 11 equipped with the stator 14 is, as shown in FIG. 3, held with a jig (not shown). A housing annular groove 11a1 is, as shown in FIG. 2, formed along a circumferential direction on an approximately central portion of the inner circumferential portion of the hollow cylindrical section 11a. An ultraviolet/heat curing type adhesive 52b' is, as shown in FIG. 3, applied in the housing annular groove 11a in a circumferential direction before or after a step of holding the first housing member 11.

Figure 4:
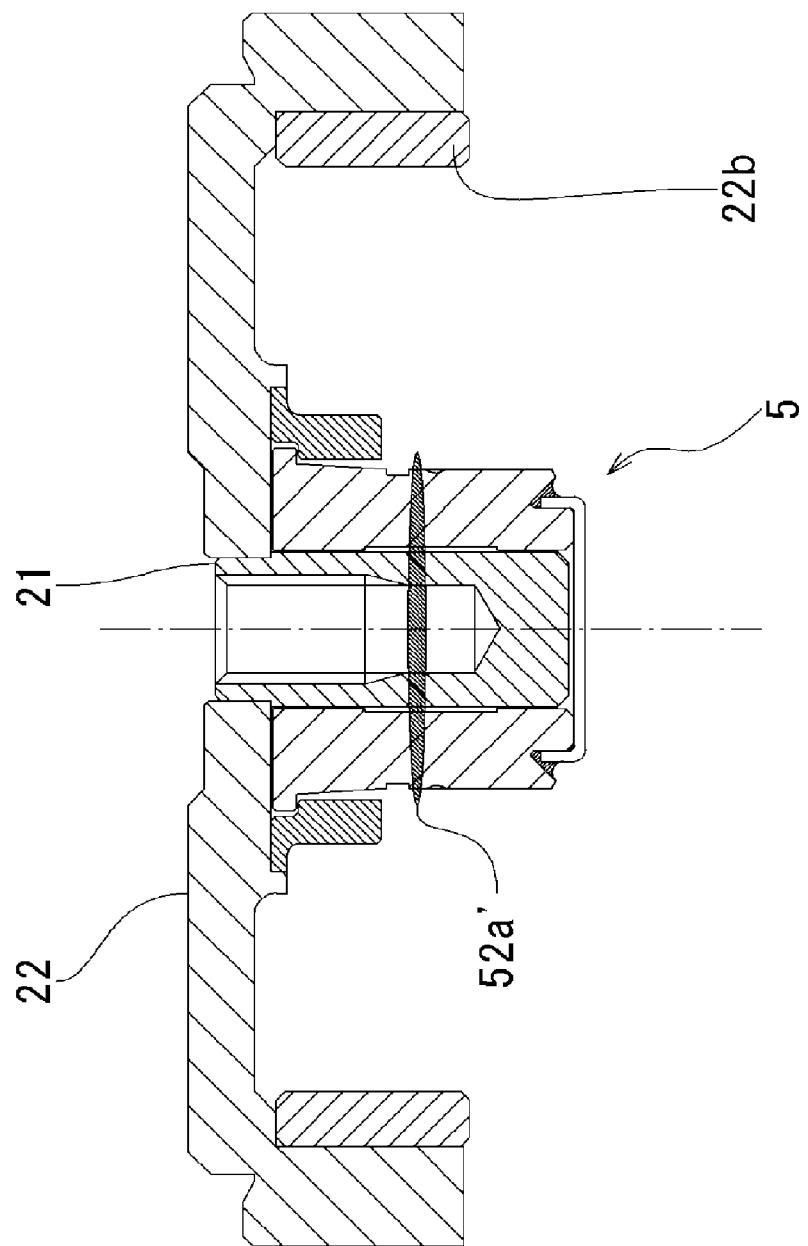
FIG. 4 is a longitudinal sectional view showing a joining step of a sleeve to a first housing member.
Figure 5:
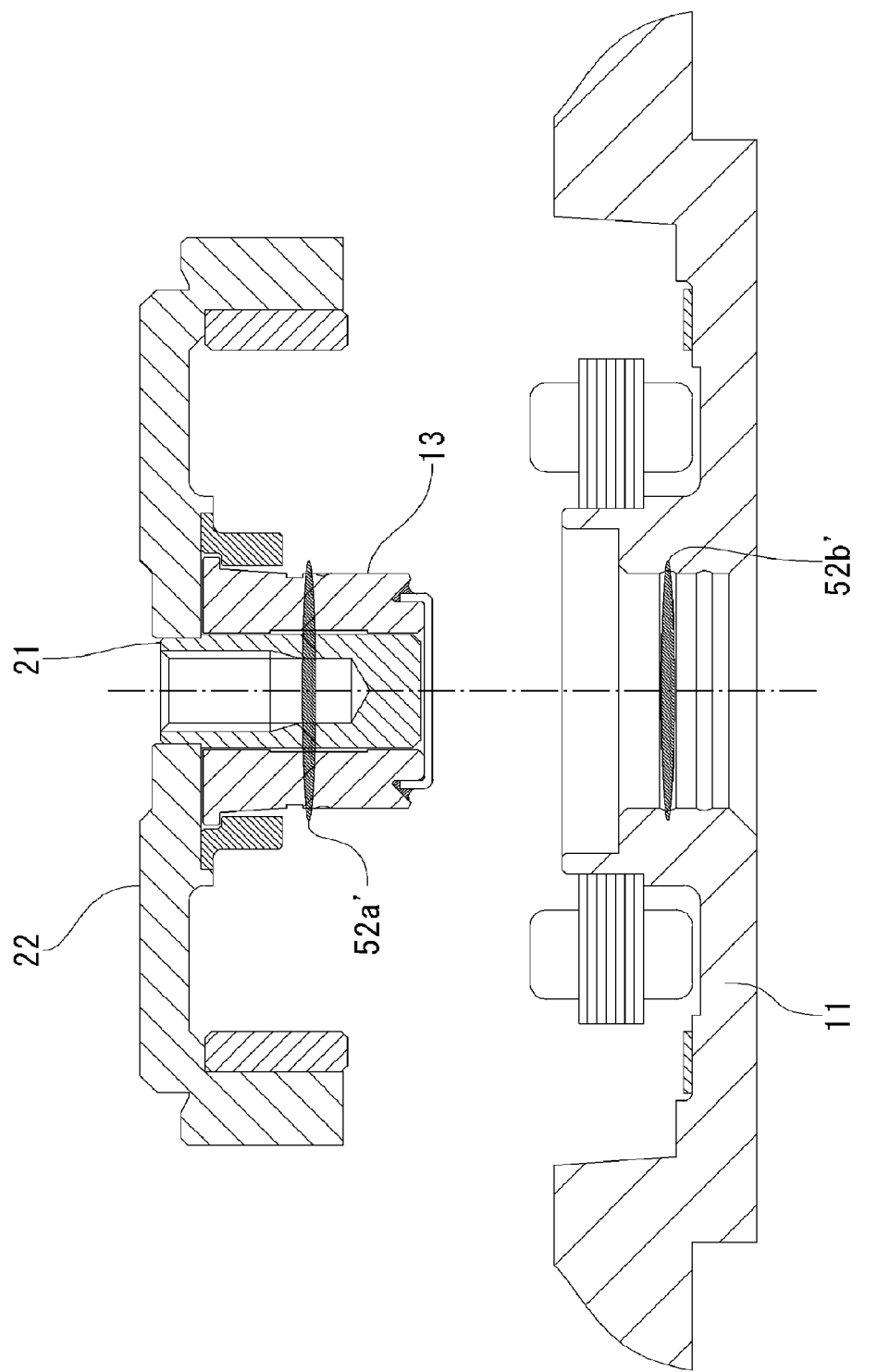
FIG. 5 is a longitudinal sectional view showing a joining step of a sleeve to a first housing member.

Then, the rotor assembly 20 equipped with the bearing assembly 5 is, as shown in FIGS. 4 and 5, held by a jig (not shown) and the rotor assembly 20 is arranged approximately coaxially with the hollow cylindrical section 11a. A sleeve annular groove 13a is, as shown in FIG. 2, formed on an outer peripheral surface of the sleeve annular groove 13a.

An anaerobic adhesive 52a' is applied on a portion slightly higher than the sleeve annular groove 13c on the outer peripheral surface of the sleeve 13 in the axial direction before or after a step of holding the rotor assembly 20.

Then, the rotor assembly 20 is, as shown in FIG. 5, inserted into the first housing member 11 from above in the axial direction and disposed in a prescribed position of the first housing member 11 in the axial direction. Thereby, the joint section 50 is formed between the inner circumferential portion of the hollow cylindrical section 11a and the outer circumferential portion of the sleeve 13. Note that the sleeve annular groove 13c is located above the housing annular groove 11a1 in the axial direction.

The anaerobic adhesive that forms the first adhering subsection 52a, at this time, is brought into the joint section 50 formed by inserting the sleeve 13 into the hollow cylindrical section 11a and the brought-in anaerobic adhesive is cured by shutting off outside air in the interior of the joint section 50. Thereby, not only is the first adhering subsection 52a formed, but the sleeve 13 is also securely held on the inner circumferential portion of the hollow cylindrical section 11a in a first temporarily fixed state. In the first temporary fixing, the sleeve 13 can be temporarily fixed in a stabler state and tilting of the shaft 21 can be well prevented since the first fixing is especially done at a position near the center of gravity of the rotor assembly 20.

The ultraviolet/heat curing type adhesive which forms the second adhesive section 52b contacts the outer circumferential portion of the sleeve 13 and is extended downward in the axial direction from the housing annular groove 11a1 by inserting the sleeve 13 into the hollow cylindrical section 11a. Thereby, the second adhesive subsection 52b is formed. Part of the extended adhesive extrudes downward in the axial direction from the joint section 50. Part of the extruded adhesive, that is part 52b1 (see FIG. 2) of the second adhesive section 52b, is immediately cured by irradiation with ultraviolet from below the part 52b1 in the axial direction. Thereby, the sleeve 13 is securely held in a second temporarily fixed state on the inner circumferential portion of the hollow cylindrical section 11a.

In the first embodiment, the anaerobic adhesive is cured in the upper portion of the joint section 50 in the axial direction to obtain the first temporarily fixed state, while part 52b1 of the ultraviolet/heat curing type adhesive is cured in the lower portion of the joint section 50 in the axial direction. Hence, since the upper and lower end portions of the joint section 50 quickly take a temporarily fixed state, the sleeve 13 is securely held in the hollow cylindrical section 11a.

Thereafter, the first housing member 11 and the rotor assembly 20 having the bearing assembly 5 in combination are put into a oven and the second adhering subsection 52b of the joint section 50 is heated and cured in the oven. Thereby the sleeve 13 is permanently fixed in the hollow cylindrical section 11a.

Since the sleeve 13 is, as described above, securely held in an extremely stable state in the hollow cylindrical section 11a by the first and second temporarily fixed state, a heating operation for an ultraviolet/heat curing adhesive (the second adhesive subsection 52b) in an inner part of the joint section 50 in the axial direction, where ultraviolet cannot be irradiated, can be simply and conveniently performed using a simple jig. Especially, since the adhesion step is implemented almost without tilting the shaft 21 described above, an extremely high precision rotation characteristic to be obtained.

Since the first temporarily fixed state can be obtained with a small quantity of an anaerobic adhesive, not only can outgassing be suppressed, but the ultraviolet/heat curing type adhesive (the second adhesive subsection 52b) can be cured without using a large scale jig, which has been conventionally adopted. Hence, a high joining strength can be obtained.

The anaerobic adhesive forming the first adhesive subsection 52a is, as described above, applying on a portion higher than the sleeve annular groove 13c on the outer circumferential portion of the sleeve 13 in the axial direction. Hence, when the sleeve 13 is inserted into the hollow cylindrical section 11a, the anaerobic adhesive is brought into the joint section 50 and partly moves downward in the axial direction, whereas since part of the moved anaerobic adhesive is accommodated in the sleeve annular groove 13c, none of the adhesive moves downward from the sleeve annular groove 13c. Therefore, mixing of the anaerobic adhesive with the ultraviolet/heat curing type adhesive can be prevented, thereby enabling the adhesives to be stably and certainly cured.

Since the sleeve 13 constituting the bearing assembly 5 is inserted into and adhered to the hollow cylindrical section 11a of the first housing member 11, the rotor assembly having the shaft 21 can be mounted to the first housing member 11 side with simplicity and convenience.

Note that in a case where a stable temporarily fixed state is obtained by the first temporary fixing, a step may be omitted of irradiating part of the ultraviolet/heat curing type ultraviolet extruded downward from the joint section in the axial direction to cure the part. Or, a quantity of the ultraviolet/heat curing type adhesive may be reduced so that part of the ultraviolet/heat curing adhesive does not extrude downward in the axial direction from the joint section.

The anaerobic adhesive and the ultraviolet/heat curing type adhesive may be applied on one or both of the outer circumferential portion of the sleeve 13 forming the joint section 50 and the inner circumferential portion of the hollow cylindrical section 11a forming the joint section 50.

Second Embodiment

Description will be given of a second embodiment of the present invention with the reference to FIG. 6. Since a motor unit of the second embodiment is equivalent to that of the first embodiment in basic structure, corresponding parts are indicated with numbers in the hundreds so as to make clear correspondence between parts and description will be given only of different points.

Figure 6:
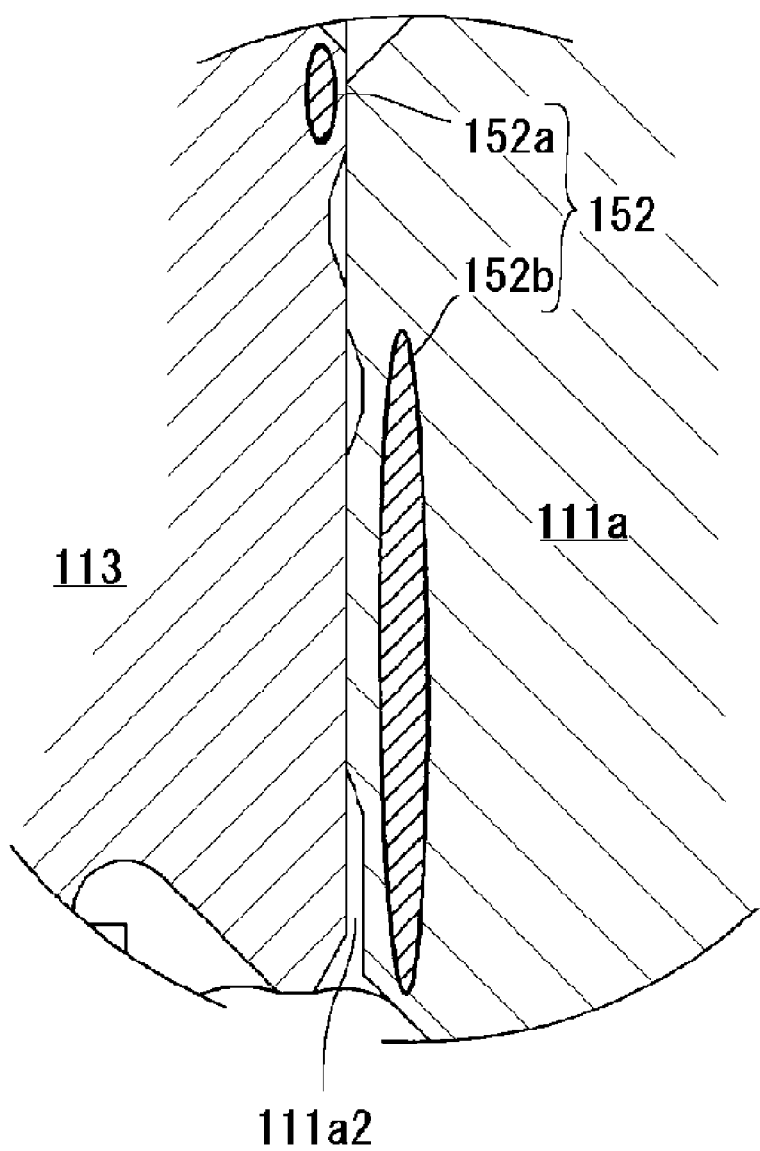
FIG. 6 is an enlarged longitudinal sectional view of a joint section of a sleeve and a first housing member related to a second embodiment of the invention.

An expanded clearance 111a2 open downward in the axial direction is, as shown in FIG. 6, formed in a lower portion in the axial direction of the hollow cylindrical section 111a of the first housing member 111. With the construction adopted, ultraviolet can be irradiated as deeply as the interior, thereby, enabling not only a highly rigid joint with higher precision to be realized, but also tilting of the shaft 121 to be prevented more.

The second embodiment as well has an action and effect similar to those of the first embodiment.

Third Embodiment

Figure 7:
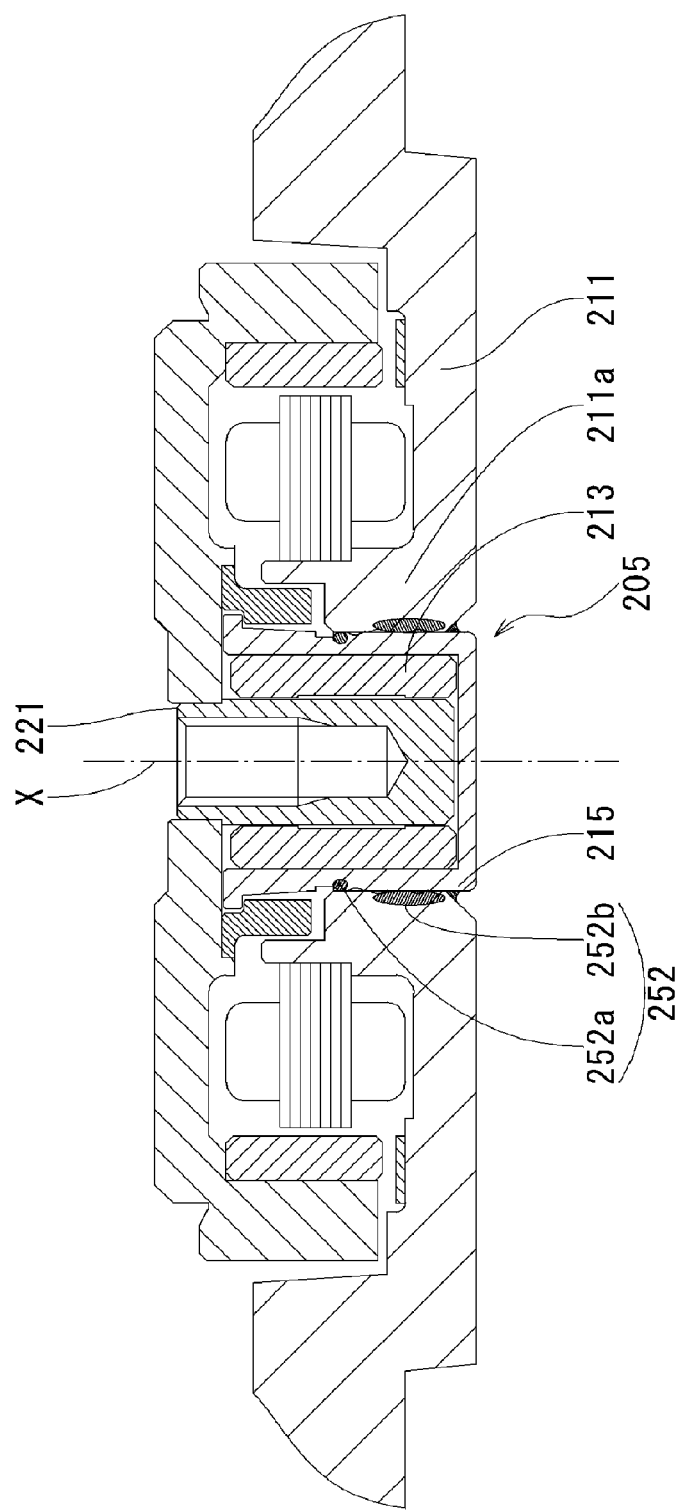
FIG. 7 is a longitudinal sectional view showing a motor unit related to a third embodiment of the invention.

Description will be given of a third embodiment of the present invention with reference to FIG. 7. Since a motor unit of the third embodiment is equivalent to that of the first embodiment in basic construction, corresponding parts are indicated with numbers in the two hundreds to make clear correspondence between parts and description will be given only of different points.

A hollow cylindrical section 211a is provided in the middle of a first housing member 211 and a bearing assembly 205 is securely held on an inner circumferential portion of the hollow cylindrical section 211a with an adhesive section 252 interposed therebetween.

A bearing assembly 205 includes: a bearing holder 215 having a bottomed cylindrical shape; a sleeve 213 press fit in a space surrounded with an inner circumferential portion of the bearing holder 215 and securely held thereon by means such as adhesion; and a shaft 221 facing the inner circumferential portion of the sleeve 213 with a micro gap interposed therebetween.

The bearing holder 215 is made of a metal material such as aluminum, an aluminum alloy, copper or a copper alloy and molded into a shape having a bottom portion at the lower end by press molding. The sleeve 213 is formed of a porous sintered body impregnated with oil. However, the present invention is not limited to the material. The sleeve 213 molded and sintered by using any of various metal powders, metal compound powders, or non-metallic powders can be used. Examples of the material are Fe—Cu, Cu—Sn, Cu—Sn—Pb, and Fe—C. With such a raw material adopted, the bearing assembly 205 including the bearing holder 215 and the sleeve 213 can be formed at low cost.

An adhesive section 252 present between an inner circumferential portion of the hollow cylindrical section 211a and an outer circumferential portion of the bearing holder 215 is formed by a first adhering subsection 252a and a second adhering subsection 252b in a similar way to that in the first embodiment.

The third embodiment as well has an action and effect similar to those of the first embodiment.

Fourth Embodiment

Description will be given of a fourth embodiment with reference to FIG. 8. Since a motor unit of the fourth embodiment is equivalent to that of the first embodiment in basic structure, corresponding parts are indicated with numbers in the three hundreds so as to make clear correspondence between parts and description will be given only of different points.

Figure 8:
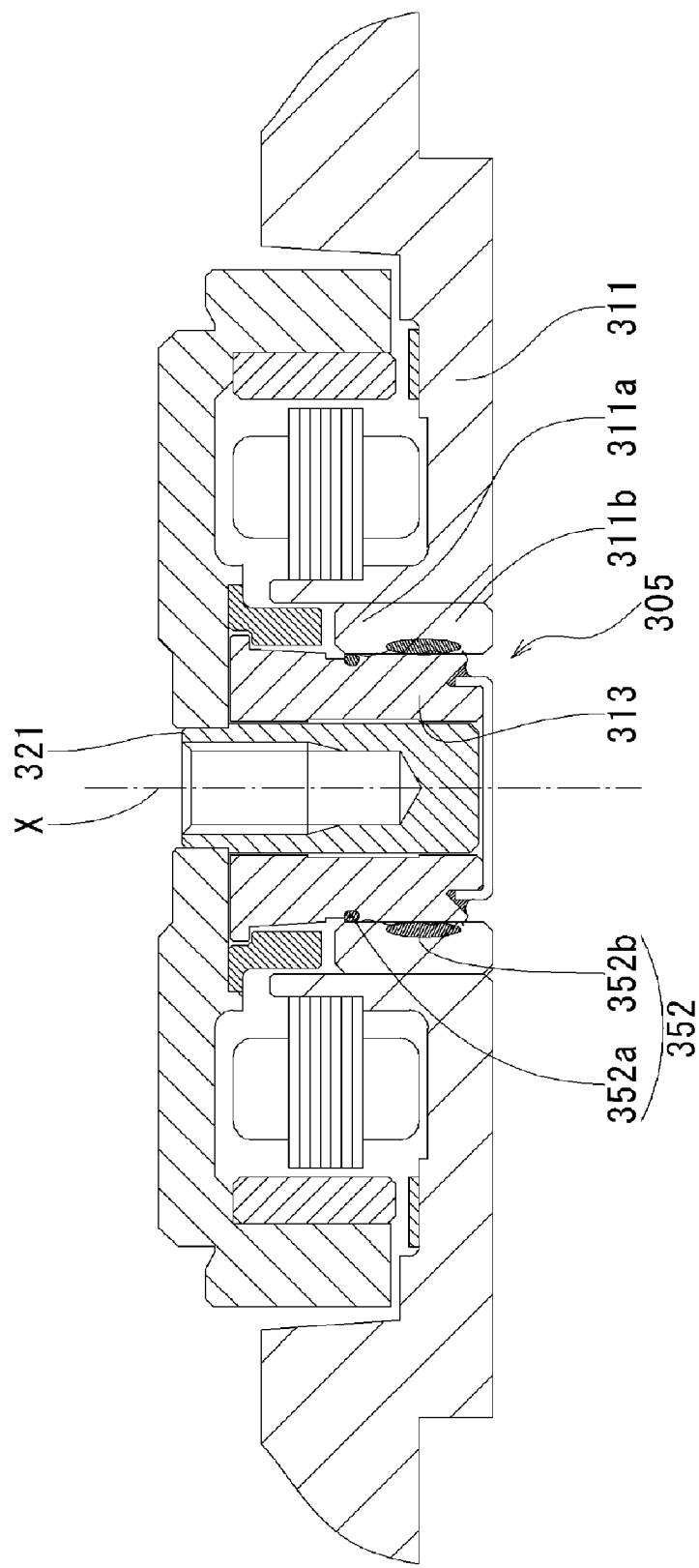
FIG. 8 is a longitudinal sectional view showing a motor unit related to a fourth embodiment of the invention.

A first housing member, as shown in FIG. 8, includes a cylindrical bush 311b on an inner circumferential portion thereof. The bush 311b has a hollow cylindrical section 311a in the middle and is securely held between a sleeve 313 and the first housing member 311 in order to absorb a vibration from the sleeve 313 to the first housing member 311.

A bearing assembly 305 having the sleeve 313 is securely held on an inner circumferential portion of the hollow cylindrical section 311a with an adhesive section 352 interposed therebetween. The adhesive section 352 is formed between the inner circumferential portion of the hollow cylindrical section 311a and an outer circumferential portion of the sleeve 313 in a similar way to that in the first embodiment. The adhesive section 352 includes a first adhering subsection 352a and a second adhesive section 352b.

The fourth embodiment as well has an action and effect similar to those of the first embodiment.

Fifth Embodiment

Figure 9:
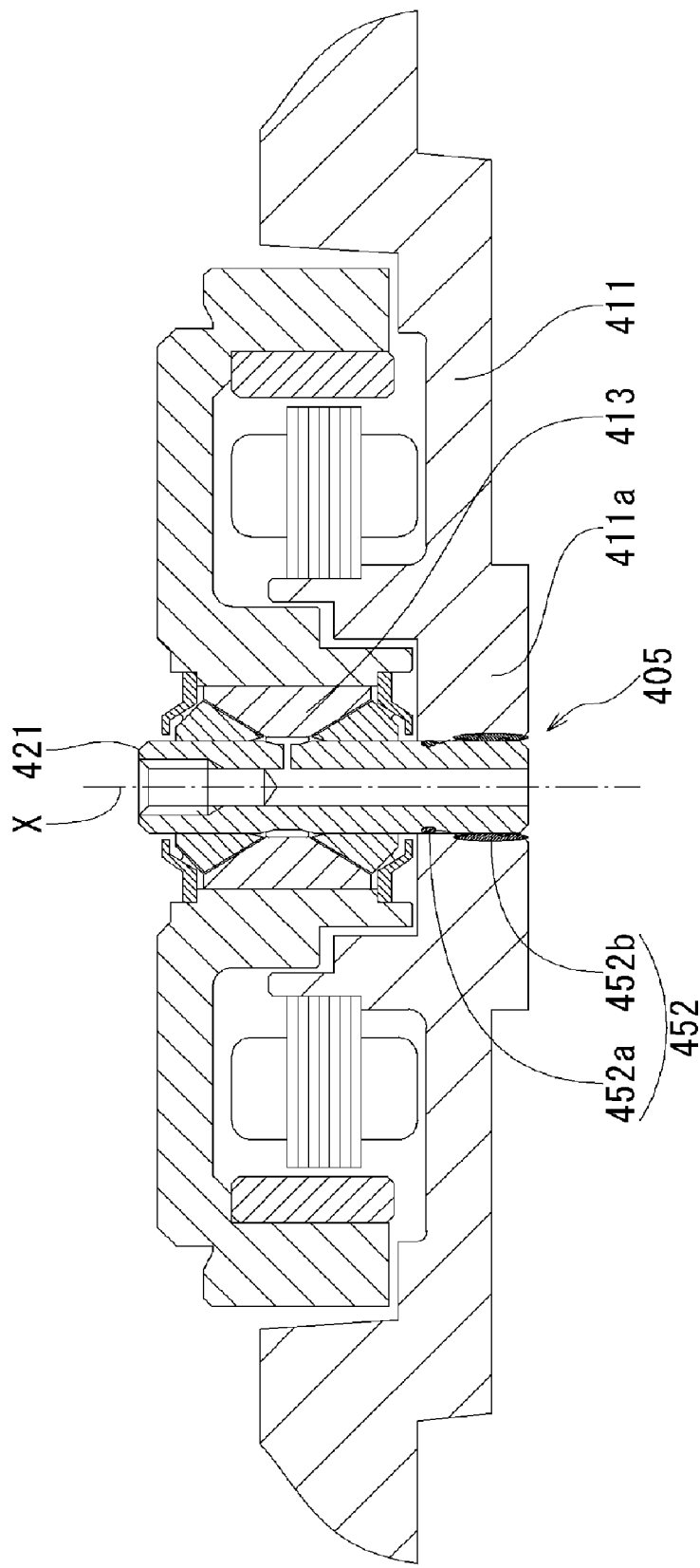
FIG. 9 is a longitudinal sectional view showing a motor unit related to a fifth embodiment of the invention.

Description will be given of a fifth embodiment with reference to FIG. 9. Since a motor unit of the fifth embodiment is equivalent to that of the first embodiment in basic structure, corresponding parts are indicated with numbers in the four hundreds so as to make clear correspondence between parts and description will be given only of different points.

A hollow cylindrical section 411a is provided in the middle of a first housing 411 and a bearing assembly 405 is securely held on an inner circumferential portion of the hollow cylindrical section 411a with an adhesive section 452 interposed therebetween.

The bearing assembly 405 includes: a shaft 421 securely held on an inner circumferential portion of the hollow cylindrical section 411a; and a sleeve 413 facing the shaft 421 with a micro gap retaining oil interposed therebetween and rotating around the same axis as the central axis X. The adhesive section 452 present between the inner circumferential portion of the hollow cylindrical section 411a and an outer circumferential portion of the shaft 421 includes a first adhesive subsection 452a and a second adhesive section 452b in a similar way to that in the first embodiment.

The fifth embodiment as well has an action and effect similar to those of the first embodiment.

Figure 10:
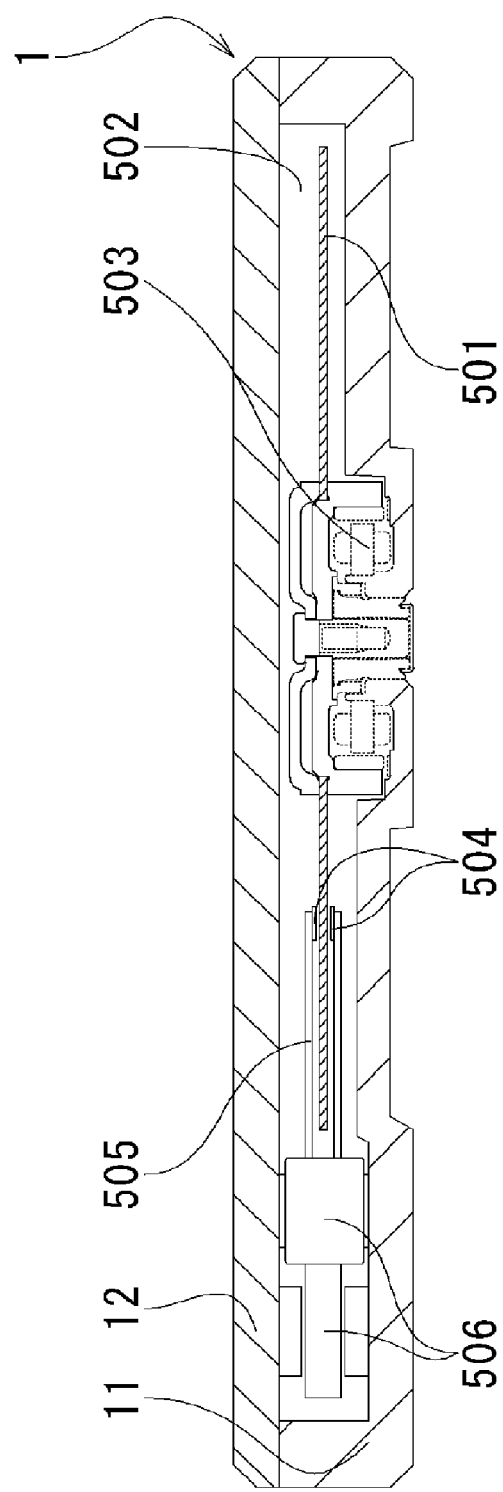
FIG. 10 is a longitudinal sectional view showing a recording disk driving apparatus equipped with a motor unit of the invention.

Recording Disk Driving Apparatus FIG. 10 is a longitudinal sectional view showing a recording disk driving apparatus equipped with a motor unit related to the embodiments of the invention.

The interior (an closed space 502) of a recording disk driving apparatus 500 is a clean chamber extremely low in dust or particles contained therein. A housing 1 includes: a bottom plate-like first housing member 11 on which an access section 508 and a spindle motor 503 are mounted; and a cover-like second housing member 12 forming the closed space 502 by covering the access section 508 and the spindle motor 503 of the first housing member 11a from above. The first housing member 11 and the second housing member 12 are joined together.

The access section 508 includes: magnet heads 504 disposed near a recording disk 501 and performing writing or reading information into or from the recording disk 501; arms 505 supporting the magnetic heads 504; and a head moving mechanism 506 changing relative positions of the magnetic heads 504 and the recording disk 501 by moving the arms 505. With such a construction adopted, the heads 504 access to a desired position on the recording disk 501 to write or read information in a state where the heads 504 are kept near the recording disk 501 in rotation.

A recording disk driving apparatus excellent in reliability and durability is realized by using a motor unit related to each of the embodiments of the invention in the recording disk driving apparatus 500.

Although only some exemplary embodiments of the present invention have been described in detail above, those skilled in the art will readily appreciated that many modifications are possible in the exemplary embodiments without materially departing from the novel teachings and advantages of the present invention. Accordingly, all such modifications are intended to be included within the scope of the present invention.

For example, the embodiments are of a construction in which the present invention is applied to a motor unit including a spindle motor for a hard disk driving (HDD)

apparatus, while the present invention can be applied to any of various kinds of motor units other than the spindle motor in a similar way.

In the above embodiments, an ultraviolet/heat curing type adhesive is adopted as an externally stimulative curing type adhesive forming the first adhering subsection, while no specific limitation is placed on an external stimulative curing type adhesive forming the first adhering subsection. For example, an ultraviolet curing type adhesive, a thermosetting type adhesive and others can also form the first adhesive subsection.

Another construction may also be adopted in which an adhesive subsection is formed in an upper region in the axial direction of the joint section using an external stimulative curing type adhesive, while an adhesive subsection using an anaerobic adhesive is formed in a region in the axial direction of the joint section lower than the adhesive subsection using the externally stimulative curing type adhesive.

The spindle motor of the embodiments described above is an outer rotor type motor, on which no specific limitation is placed, and an inner rotor type motor is also adopted. A bearing assembly can also be a so-called gas dynamic pressure bearing using gas as a fluid. With such a construction adopted, as well, an action and effect similar to those of the invention can be obtained.

Each of the first housing members of the motor units related to the embodiments has only to be at least part of a housing or may also be part other than the first housing member (for example, a second housing or part of the second housing). A first housing member may be formed integrally with the housing in a single piece.

What is claimed is:

1. A motor unit comprising:
a housing member that is a part of a housing which forms a closed space therein, the housing member including a hollow cylindrical section;
an electric motor which is accommodated into the closed space, the electric motor including a stator which is fixed by the housing member, a bearing assembly secured in the hollow cylindrical section, and a rotor assembly which is supported by the bearing assembly, the rotor assembly holding a rotor magnet facing the stator on an outer circumferential portion thereof, and rotating around a central axis which is approximately coaxial with a central axis of the hollow cylindrical section;
adhesives;
a joint section comprising an inner circumferential portion of the hollow cylindrical section, an outer circumferential portion of the bearing assembly and the adhesives intervening therebetween;
a first adhesive subsection, being a part of and formed to a predetermined extent in the joint section, and including an anaerobic adhesive as a principal component of the adhesives; and
a second adhesive subsection, also being a part of the joint section, and formed to an extent that is larger than the extent of the first adhesive subsection, and including an externally stimulated curing type adhesive as a principal component of the adhesives, the externally stimulated curing type adhesive cured by at least one of heating treatment and ultraviolet irradiation treatment.

2. The motor unit according to claim 1, wherein the position of the first adhesive subsection is closer to an upper end of the bearing assembly than that of the second adhesive subsection, the upper end of the bearing assembly where the rotor assembly is secured to the bearing assembly.

3. The motor unit according to claim 1, wherein the externally stimulated curing type adhesive is an ultraviolet/heat curing adhesive which can be cured either by heating treatment or by ultraviolet irradiation treatment.

4. The motor unit according to claim 3, wherein when the bearing assembly is moved in the axial direction relatively to the hollow cylindrical section of the housing member and thereby inserted thereinto, a part of the ultraviolet/heat curing type adhesive extruded from the joint section in the axial direction is cured by irradiation with ultraviolet from above or below the part of the ultraviolet/heat curing type adhesive in the axial direction.

5. The motor unit according to claim 1, wherein:
the first adhesive subsection is formed axially apart from the second adhesive subsection;
at least one of the inner circumferential portion of the hollow cylindrical section and the outer circumferential portion of the bearing assembly is radially dent to form a recess; and
the recess is formed between the first adhesive subsection and the second adhesive subsection.

6. A recording disk driving apparatus to which a recording disk capable of storing information therein is mounted comprising:
the motor unit according to claim 1, the motor unit rotating the recording disk;
an access apparatus for reading and writing information from and into the recording disk; and
a housing comprising the housing member, the housing forming the closed space therein.

7. A method for joining a bearing assembly to a hollow cylindrical section formed approximately coaxially with a central axis of a bearing assembly of a motor unit having a electric motor and the housing member that is a part of a housing accommodating the electric motor into a closed space thereof, comprising the steps of:
holding the housing member;
disposing the bearing assembly approximately coaxially with the hollow cylindrical section to hold the bearing assembly after the step of holding the housing member;
applying an anaerobic adhesive on at least one of the inner circumferential portion of the hollow cylindrical section and the outer circumferential portion of the bearing assembly;
applying an externally stimulated curing type adhesive on at least one of the inner circumferential portion of the hollow cylindrical section and the outer circumferential portion of the bearing assembly; and
moving the bearing assembly relatively to the housing member in an axial direction to insert the bearing assembly into the hollow cylindrical section of the housing member, to thereby join an outer circumferential portion of the bearing assembly to an inner circumferential portion of the hollow cylindrical section to form a joint section which comprises
an inner circumferential portion of the hollow cylindrical section, an outer circumferential portion of the bearing assembly, the anaerobic adhesives and the externally stimulated curing type adhesive, the adhesives intervening therebetween,
a first adhesive subsection including the anaerobic adhesives, the first adhesive subsection formed to a predetermined extent in the joint section,
a second adhesive subsection including the externally stimulated curing type adhesive, the second adhesive subsection formed in the joint section to an extent that is larger than the extent of the first adhesive subsection, after the step of applying an anaerobic adhesive and the step of applying an externally stimulated curing type adhesive.

8. The method for joining a bearing assembly to a hollow cylindrical section of a housing member according to claim 7, wherein the externally stimulated curing type adhesive forming the second adhesive subsection is an ultraviolet/heat curing type adhesive which can be cured either by heating treatment or by ultraviolet irradiation treatment.

9. The method for joining a bearing assembly to a hollow cylindrical section of a housing member according to claim 8, further comprising a step of irradiating a part of the ultraviolet/heat curing type adhesive extruded from the joint section in the axial direction, the part formed by the step of moving the bearing assembly relatively to the housing member in the axial direction to insert the bearing assembly into the hollow cylindrical section of the housing member.

10. The method for joining a bearing assembly to a hollow cylindrical section of a housing member according to claim 7, wherein:
at least one of the inner circumferential portion of the hollow cylindrical section and the outer circumferential portion of the bearing assembly is radially dent to form a recess; and
the recess divides the joint section into two axially arranged parts, one of which includes an anaerobic adhesive as the principal component of the adhesives to form a first adhesive subsection, the other of which includes an externally stimulated curing type adhesive as the principal component of the adhesives to form a second adhesive subsection.

11. The method for joining a bearing assembly to a hollow cylindrical section of a housing member according to claim 7, wherein the position at which the anaerobic adhesive is applied is closer to the upper end of the bearing assembly than the position at which an externally stimulated curing type adhesive is applied, the upper end of the bearing assembly where the rotor assembly is secured to the bearing assembly.

12. A method for joining a bearing assembly to a hollow cylindrical section formed approximately coaxially with a central axis of a bearing assembly of a motor unit having a electric motor and the housing member that is a part of a housing accommodating the electric motor into a closed space thereof, comprising the steps of:
holding the housing member;
disposing the bearing assembly approximately coaxially with the hollow cylindrical section to hold the bearing assembly after the step of holding the housing member;
applying an anaerobic adhesive on the inner circumferential portion of the hollow cylindrical section and the outer circumferential portion of the bearing assembly;
applying an externally stimulated curing type adhesive on a cylindrical section and the outer circumferential portion of the bearing assembly; and
moving the bearing assembly relatively to the housing member in an axial direction to insert the bearing assembly into the hollow cylindrical section of the housing member, to thereby join an outer circumferential portion of the bearing assembly to an inner circumferential portion of the hollow cylindrical section to form a joining section which comprises
an inner circumferential portion of the hollow cylindrical section, an outer circumferential portion of the bearing assembly, the anaerobic adhesives and the externally stimulated curing type adhesive, the adhesives intervening therebetween,
a first adhesive subsection including the anaerobic adhesives, the first adhesive subsection formed to a predetermined extent in the joint section,
a second adhesive subsection including the externally stimulated curing type adhesive, the second adhesive subsection formed in the joint section to an extent that is larger than the extent of the first adhesive subsection,
after the step of applying an anaerobic adhesive and the step of applying an externally stimulated curing type adhesive.

13. The method for joining a bearing assembly to a hollow cylindrical section of a housing member according to claim 12, wherein the externally stimulated curing type adhesive forming the second adhesive subsection is an ultraviolet/heat curing type adhesive.

14. The method for joining a bearing assembly to a hollow cylindrical section of a housing member according to claim 13, further comprising a step of irradiating a part of the ultraviolet/heat curing type adhesive extruded from the joint section in the axial direction by inserting the bearing assembly into the hollow cylindrical section of the housing member with ultraviolet light from above or below the part of adhesive in the axial direction to cure the part of adhesive.

15. The method for joining a bearing assembly to a hollow cylindrical section of a housing member according to claim 12, wherein:
the first adhesive subsection is formed axially apart from the second adhesive subsection;
at least one of the inner circumferential portion of the hollow cylindrical section and the outer circumferential portion of the bearing assembly is radially dent to form a recess; and
the recess is formed between the first adhesive subsection and the second adhesive subsection.

16. The method for joining a bearing assembly to a hollow cylindrical section of a housing member according to claim 12, wherein the position of the first adhesive subsection is closer to an upper end of the bearing assembly than that of the second adhesive subsection, the upper end of the bearing assembly where the rotor assembly is secured to the bearing assembly.

* * * * *